(12) United States Patent
Davis et al.

(10) Patent No.: US 11,629,649 B2
(45) Date of Patent: Apr. 18, 2023

(54) GAS TURBINE ENGINE WITH SPEED SENSOR

(71) Applicant: Raytheon Technologies Corporation, Farmington, CT (US)

(72) Inventors: Todd A. Davis, Tolland, CT (US); Brian P. Cigal, Windsor, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 121 days.

(21) Appl. No.: 16/871,163

(22) Filed: May 11, 2020

(65) Prior Publication Data
US 2021/0348565 A1 Nov. 11, 2021

(51) Int. Cl.
*F02C 7/06* (2006.01)
*F01D 17/06* (2006.01)
(Continued)

(52) U.S. Cl.
CPC .............. *F02C 7/36* (2013.01); *F01D 21/003* (2013.01); *F01D 25/16* (2013.01); *F02C 7/06* (2013.01); *F02K 3/06* (2013.01); *F16C 41/007* (2013.01); *G01P 3/443* (2013.01); *F01D 15/12* (2013.01); *F05D 2240/54* (2013.01); *F05D 2240/60* (2013.01); *F05D 2260/40311* (2013.01); *F05D 2260/98* (2013.01); *F05D 2270/304* (2013.01)

(58) Field of Classification Search
CPC ........ F01D 17/06; F01D 21/003; F01D 25/16; F01D 25/162; F02C 7/36
See application file for complete search history.

(56) References Cited

U.S. PATENT DOCUMENTS

| 3,287,906 A | 11/1966 | McCormick |
| 4,075,562 A | 2/1978 | Karstensen et al. |

(Continued)

FOREIGN PATENT DOCUMENTS

| DE | 102006025556 | 12/2007 |
| EP | 1918527 | 5/2008 |

(Continued)

OTHER PUBLICATIONS

European Search Report for European Patent 21173401.7 dated Aug. 24, 2021.

(Continued)

*Primary Examiner* — Justin D S Seabe
(74) *Attorney, Agent, or Firm* — Carlson, Gaskey & Olds, P.C.

(57) ABSTRACT

A gas turbine engine includes, among other things, a fan, a fan drive gear system that is coupled with the fan and a fan drive input shaft, a compressor section that includes a first compressor and a second compressor, and a turbine section. The turbine section includes a first turbine coupled with a first shaft and a second turbine coupled through a second shaft to the second compressor. A bearing supports the fan drive input shaft. The bearing is located proximal to, and radially spaced from, a forward end of the first shaft. The bearing includes a speed sensor target that is rotatable with the forward end and that defines a rotation path. A speed sensor probe is situated proximal to the rotation path and is operable to read the speed sensor target.

16 Claims, 7 Drawing Sheets

(51) Int. Cl.
  *F01D 25/16* (2006.01)
  *F02C 7/36* (2006.01)
  *F02K 3/06* (2006.01)
  *F16C 41/00* (2006.01)
  *G01P 3/44* (2006.01)
  *F01D 21/00* (2006.01)
  *F01D 15/12* (2006.01)

(56) References Cited

U.S. PATENT DOCUMENTS

| | | | |
|---|---|---|---|
| 4,716,723 | A | 1/1988 | Ralston et al. |
| 4,827,712 | A | 5/1989 | Coplin |
| 4,854,120 | A | 8/1989 | Nelson et al. |
| 5,067,355 | A | 11/1991 | Witte |
| 5,663,640 | A | 9/1997 | Sakamoto |
| 5,915,917 | A | 6/1999 | Eveker et al. |
| 6,161,962 | A | 12/2000 | French et al. |
| 6,176,074 | B1 | 1/2001 | Thompson et al. |
| 6,321,525 | B1 | 11/2001 | Rogers |
| 6,393,355 | B1 | 5/2002 | Muramatsu |
| 6,659,712 | B2 * | 12/2003 | Brooks ............... G01M 15/14 |
| | | | 415/118 |
| 7,090,165 | B2 | 8/2006 | Jones et al. |
| 7,188,475 | B2 | 3/2007 | McGinley |
| 7,694,505 | B2 | 4/2010 | Schilling |
| 7,818,970 | B2 | 10/2010 | Price et al. |
| 7,950,237 | B2 | 5/2011 | Grabowski |
| 9,823,145 | B2 | 11/2017 | Rousselin et al. |
| 9,869,249 | B2 * | 1/2018 | Cigal .................... F02C 3/107 |
| 10,174,629 | B1 | 1/2019 | Valva et al. |
| 10,190,440 | B2 | 1/2019 | Argote et al. |
| 10,422,341 | B2 * | 9/2019 | Brault ................... F04D 19/002 |
| 2003/0030565 | A1 | 2/2003 | Sakatani et al. |
| 2004/0187473 | A1 | 9/2004 | Rowe |
| 2005/0200349 | A1 | 9/2005 | Duke |
| 2005/0206134 | A1 | 9/2005 | Raszkowski et al. |
| 2005/0217274 | A1 | 10/2005 | Maramatsu et al. |
| 2007/0055435 | A1 | 3/2007 | Muramatsu et al. |
| 2009/0007569 | A1 | 1/2009 | Lemmers et al. |
| 2009/0110545 | A1 | 4/2009 | Davis et al. |
| 2010/0000222 | A1 | 1/2010 | Price et al. |
| 2010/0058735 | A1 | 3/2010 | Hurwitz et al. |
| 2010/0148396 | A1 | 6/2010 | Xie et al. |
| 2010/0324799 | A1 | 12/2010 | Davison |
| 2010/0331139 | A1 | 12/2010 | McCune |
| 2011/0041512 | A1 | 2/2011 | Tezuka et al. |
| 2011/0173990 | A1 | 7/2011 | Thies |
| 2011/0286836 | A1 | 11/2011 | Davis |
| 2012/0195753 | A1 | 8/2012 | Davis et al. |
| 2013/0058775 | A1 | 3/2013 | Simms |
| 2016/0069270 | A1 * | 3/2016 | Schwarz .................... F02C 7/36 |
| | | | 415/122.1 |
| 2016/0363001 | A1 * | 12/2016 | Argote ...................... F02C 9/48 |
| 2020/0200788 | A1 * | 6/2020 | Davies ................... G01D 5/2451 |
| 2021/0087977 | A1 * | 3/2021 | Becoulet ................... F02C 7/36 |
| 2021/0246840 | A1 * | 8/2021 | Tremblay ................ F01D 17/06 |

FOREIGN PATENT DOCUMENTS

| | | |
|---|---|---|
| EP | 2544010 | 1/2013 |
| EP | 3103969 | 12/2016 |
| EP | 3354882 | 8/2018 |
| EP | 341526 | 12/2018 |
| EP | 3546726 | 10/2019 |
| EP | 3623607 | 3/2020 |
| GB | 1516041 | 6/1978 |
| GB | 2041090 | 9/1980 |
| JP | 2004045219 | 2/2004 |
| WO | 2007038674 | 4/2007 |
| WO | 2014150420 | 9/2014 |

OTHER PUBLICATIONS

Gunston: "Jane's Aero-Engines," Pratt & Whitney/USA, Mar. 2000, JAEng-Issue 7, Copyright 2000 by Jane's Information Group Limited, pp. 510-512.

International Search Report and Written Opinion for International Application No. PCT/US2014/023209 dated Jul. 10, 2014.

International Preliminary Report on Patentability for PCT Application No. PCT/US2012/071553 dated Aug. 14, 2014.

International Preliminary Report on Patentability for PCT Application No. PCT/US2014/023209 dated Sep. 24, 2015.

European Supplementary Search Report for EP Patent Application No. 12867609.5 completed Oct. 28, 2015.

Singapore Search Report for Singapore Patent Application No. 11201402816R Apr. 7, 2015.

Conference on Engineering and Physics: Synergy for Success 2006. Journal of Physics: Conference Series vol. 105. London, UK. Oct. 5, 2006.

Kurzke, J. (2009) Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's guiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y. Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

(56) References Cited

OTHER PUBLICATIONS

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF502: plugging the turbofan gap. Flight International, p. 237-241, Jan. 30, 1982.

Hughes, C. (2010). Geared turbofan technology. NASA Environmentally Responsible Aviation Project. Green Aviation Summit NASA Ames Research Center. Sep. 8-9, 2010.

Supplementary Search Report for European Patent Application No. 14769116 completed Sep. 15, 2016.

International Search Report for PCT Application No. PCT/US12/071553 completed on Jan. 17, 2013.

Third Party Observations submitted by Rolls-Royce Plc for European Patent Application No. 14769116.6 (EP2971675) dated Feb. 7, 2020.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

The jet engine. Rolls-Royce plc. 5th Edition. 2005. pp. 178.

\* cited by examiner

GAS TURBINE ENGINE WITH SPEED SENSOR

BACKGROUND

A typical turbofan engine includes a compressor section and a turbine section that is coupled to drive the compressor section and a fan of the engine. In a two-spool engine design, a high pressure turbine is coupled through a high shaft to drive a high pressure compressor, and a low pressure turbine is coupled through a low shaft to drive a low pressure compressor and the fan. A speed sensor probe reads the speed of the low shaft. Detection of an over-speed condition may be used to trigger mitigation measures, such as reducing fuel flow.

SUMMARY

A gas turbine engine according to an example of the present disclosure includes a fan, a fan drive gear system coupled with the fan and a fan drive input shaft, a compressor section including a first compressor and a second compressor, and a turbine section. The turbine section includes a first turbine coupled with a first shaft, and a second turbine coupled through a second shaft to the second compressor. A bearing assembly supports the fan drive input shaft. The bearing assembly is located proximal to, and radially spaced from, a forward end of the first shaft. The bearing assembly includes a speed sensor target that is rotatable with the forward end and that defines a rotation path. A speed sensor probe is situated proximal to the rotation path and is operable to read the speed sensor target.

In a gas turbine engine according to a further example of the foregoing examples, the bearing assembly includes a radially outer bearing retainer, a radially outer bearing race retained in the radially outer bearing retainer, a radially inner bearing retainer, and a radially inner bearing race retained in the radially inner bearing retainer, and the speed sensor target is disposed proximal to the radially inner bearing retainer.

In a gas turbine engine according to a further example of the foregoing examples, the radially inner bearing retainer includes a bracket section, and a shank section that connects the bracket section to the fan drive input shaft and radially spaces at least a portion of the bearing assembly from the forward end, and the speed sensor target is located on the bracket section.

In a gas turbine engine according to a further example of the foregoing examples, the bracket section includes an axially elongated wall, and a radial shoulder projects from a forward portion of the axially elongated wall, and the speed sensor target is located on the radial shoulder.

In a gas turbine engine according to a further example of the foregoing examples, the radial shoulder includes a forward axial face, and the speed sensor target projects axially from the forward axial face.

In a gas turbine engine according to a further example of the foregoing examples, the radial shoulder includes a radial face, and the speed sensor target projects radially from the radial face.

In a gas turbine engine according to a further example of the foregoing examples, the speed sensor target is bonded to the radially inner bearing retainer.

In a gas turbine engine according to a further example of the foregoing examples, the speed sensor target includes a flange that is disposed radially between the radially inner bearing race and the radially inner bearing holder.

In a gas turbine engine according to a further example of the foregoing examples, the speed sensor target includes an optical target.

In a gas turbine engine according to a further example of the foregoing examples, the first shaft has a shaft diameter at the first end, and at least a portion of the bearing assembly is radially spaced from the first shaft by at least 10% of the shaft diameter.

In a gas turbine engine according to a further example of the foregoing examples, the first shaft has a shaft diameter at the first end, and at least a portion of the bearing assembly is radially spaced from the first shaft by no more than 60% of the shaft diameter.

A gas turbine engine according to an example of the present disclosure includes a fan, a fan drive gear system coupled with the fan and a fan drive input shaft, a compressor section including a first compressor and a second compressor, and a turbine section. The turbine section includes a first turbine coupled with a first shaft, an a second turbine coupled through a second shaft to the second compressor. A bearing assembly is proximal a forward and of the first shaft and supports the first shaft. The bearing assembly includes a radially outer portion that is non-rotatable and a radially inner portion that is rotatable with the forward end of the first shaft. The radially inner portion includes a speed sensor target and that defines a rotation path. A speed sensor probe is situated proximal to the rotation path and is operable to read a rotational speed of the bearing assembly from the speed sensor target.

In a gas turbine engine according to a further example of the foregoing examples, the radially outer portion includes a radially outer bearing retainer and a radially outer bearing race retained in the radially outer bearing retainer, and the inner portion includes a radially inner bearing retainer and a radially inner bearing race retained in the radially inner bearing retainer.

In a gas turbine engine according to a further example of the foregoing examples, the speed sensor target and the radially inner bearing retainer together provide a single, monolithic body.

In a gas turbine engine according to a further example of the foregoing examples, the radially inner bearing retainer includes a bracket section, and the speed sensor target projects off of the bracket section.

A gas turbine engine according to an example of the present disclosure includes a means for determining a rotational speed of at least a portion of a bearing assembly.

In a gas turbine engine according to a further example of the foregoing examples, the means includes a speed sensor target on the bearing assembly and a speed sensor probe situated proximal to the speed sensor target.

A gas turbine engine according to a further example of the foregoing examples further includes determining a rotational speed of the first shaft based on the rotational speed of the portion of the bearing assembly.

A gas turbine engine according to an example of the present disclosure includes a fan, a compressor section including a first compressor and a second compressor, a fan drive gear system having an output shaft coupled with the first compressor and the fan, and a turbine section. The turbine section includes a first turbine coupled with a first shaft, a forward end of the first shaft connected in a joint to an aft end of a fan drive input shaft, the fan drive input shaft received into the fan drive gear system, and a second turbine coupled through a second shaft to the second compressor. A bearing set supports the first shaft. The bearing set is located adjacent to the joint. The bearing set includes a speed sensor target that is rotatable with the forward end and that defines a rotation path. A speed sensor probe is situated adjacent the rotation path and is operable to read the speed sensor target.

In a gas turbine engine according to a further example of the foregoing examples, the bearing set includes a radially outer bearing retainer, a radially outer bearing race retained in the radially outer bearing retainer, a radially inner bearing retainer, a radially inner bearing race retained in the radially inner bearing retainer, and the speed sensor target is on the radially inner bearing retainer.

In a gas turbine engine according to a further example of the foregoing examples, the radially inner bearing retainer includes a bracket section, a shank section that connects the bracket section to the fan drive input shaft and radially spaces the bearing set from the forward end, and the speed sensor target is located on the bracket section.

In a gas turbine engine according to a further example of the foregoing examples, the bracket section includes an axially elongated wall, a radial shoulder projects from a forward portion of the axially elongated wall, and the speed sensor target is located on the radial shoulder.

In a gas turbine engine according to a further example of the foregoing examples, the radial shoulder includes a forward axial face, and the speed sensor target projects axially from the forward axial face.

In a gas turbine engine according to a further example of the foregoing examples, the radial shoulder includes a radial face, and the speed sensor target projects radially from the radial face.

In a gas turbine engine according to a further example of the foregoing examples, the speed sensor target is bonded to the radially inner bearing retainer.

In a gas turbine engine according to a further example of the foregoing examples, the speed sensor target includes a flange that is sandwiched radially between the radially inner bearing race and the radially inner bearing holder.

In a gas turbine engine according to a further example of the foregoing examples, the speed sensor target is an optical target.

In a gas turbine engine according to a further example of the foregoing examples, the first shaft has a shaft diameter at the first end, and the bearing set is radially spaced from the first shaft by at least 10% of the shaft diameter.

In a gas turbine engine according to a further example of the foregoing examples, the first shaft has a shaft diameter at the first end, and the bearing set is radially spaced from the first shaft by no more than 60% of the shaft diameter.

A gas turbine engine according to an example of the present disclosure includes a fan, a compressor section including a first compressor and a second compressor, a fan drive gear system having an output shaft coupled with the first compressor and the fan, and a turbine section. The turbine section includes a first turbine coupled with a first shaft, the first shaft connected in a joint to a fan drive input shaft, the fan drive input shaft received into the fan drive gear system, and a second turbine coupled through a second shaft to the second compressor. Rotation of the first turbine rotationally drives the first shaft and the fan drive input shaft, which drives the fan and the first compressor though the fan drive gear system. The rotation of the first turbine to rotationally drive the first shaft subjects the first shaft to torsional deflection. The first shaft has a twist section at which the torsional deflection is greatest along the first shaft. A bearing set supports the first shaft, the bearing set is located adjacent to the twist section. The bearing set includes a speed sensor target that is rotatable with the twist section and that defines a rotation path. A speed sensor probe is situated adjacent the rotation path and is operable to read the speed sensor target.

In a gas turbine engine according to a further example of the foregoing examples, the first shaft has a forward end that is connected in the joint, and the twist section is at the forward end.

In a gas turbine engine according to a further example of the foregoing examples, the bearing set includes a radially outer portion that is non-rotatable and a radially inner portion that is rotatable with the first shaft, the radially inner portion including the speed sensor target.

In a gas turbine engine according to a further example of the foregoing examples, the radially outer portion includes a radially outer bearing retainer and a radially outer bearing race retained in the radially outer bearing retainer, the inner portion includes a radially inner bearing retainer and a radially inner bearing race retained in the radially inner bearing retainer, and the speed sensor target is located on the radially inner bearing retainer.

A gas turbine engine according to an example of the present disclosure includes a fan, a compressor section including a first compressor and a second compressor, a fan drive gear system having an output shaft coupled with the first compressor and the fan, and a turbine section. The turbine section includes a first turbine coupled with a first shaft, a forward end of the first shaft connected in a joint to an aft end of a fan drive input shaft, the fan drive input shaft received into the fan drive gear system, and a second turbine coupled through a second shaft to the second compressor. There is a bearing set adjacent to the forward and of the first shaft that supports the first shaft. The bearing set includes a radially outer portion that is non-rotatable and a radially inner portion that is rotatable with the forward end of the first shaft. The radially inner portion includes a speed sensor target and defines a rotation path. A speed sensor probe is situated adjacent the rotation path and is operable to read a rotational speed of the bearing set from the speed sensor target as a surrogate for a rotational speed of the first shaft.

In a gas turbine engine according to a further example of the foregoing examples, the radially outer portion includes a radially outer bearing retainer and a radially outer bearing race retained in the radially outer bearing retainer, and the inner portion includes a radially inner bearing retainer and a radially inner bearing race retained in the radially inner bearing retainer.

In a gas turbine engine according to a further example of the foregoing examples, the speed sensor target and the radially inner bearing retainer together constitute a single, monolithic body.

In a gas turbine engine according to a further example of the foregoing examples, the radially inner bearing retainer includes a bracket section, and the speed sensor target is projects off of the bracket section.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1A:
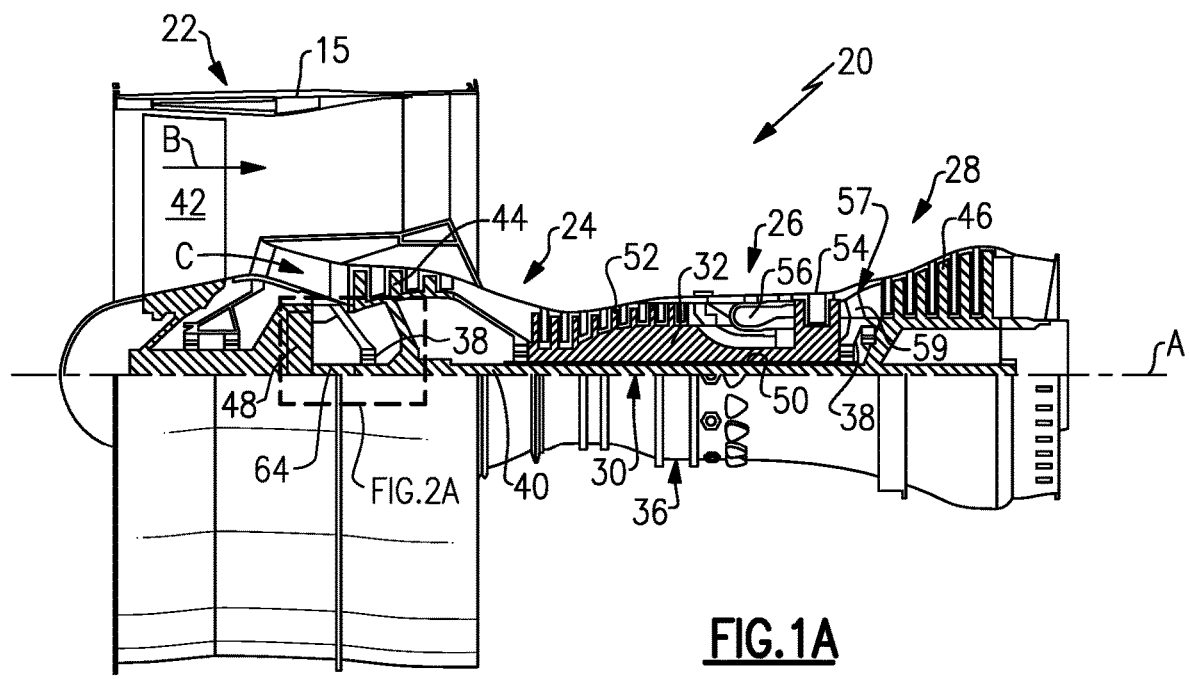
FIG. 1A illustrates a gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a fan drive gear system 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1$bm$ of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 1B:
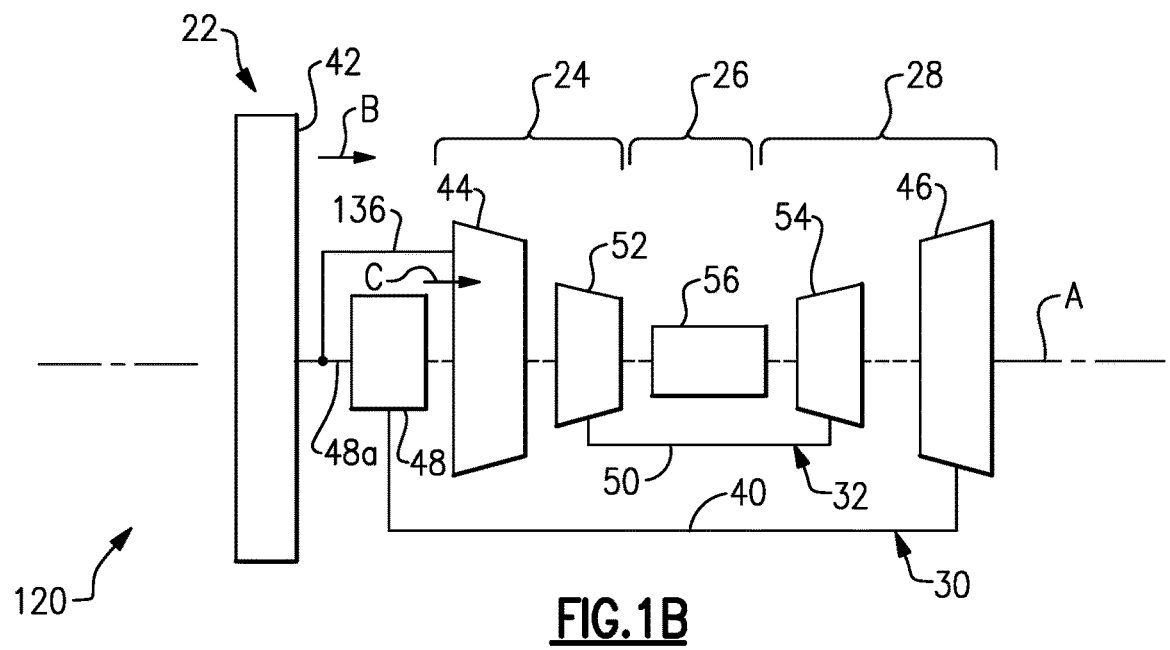
FIG. 1B illustrates another example of a gas turbine engine that has a different architecture than the engine in FIG. 1A.

FIG. 1B schematically illustrates another example gas turbine engine 120. The gas turbine engine 120 is similar to engine 20 and in that regard is numbered identically. The inner shaft 40 is connected to the fan 42 through the fan drive gear system 48 and an output shaft 48$a$, to drive a fan 42 and the low pressure compressor 44 at a lower speed than the shaft 40. In the engine 220, however, the low pressure compressor 44 is coupled with the fan 42 via a coupling or shaft 136. The rotation of the low pressure compressor 44 is thus tied to rotation of the fan 42. The low pressure turbine 46 drives the low pressure compressor 44 through the fan drive gear system 48. The low pressure compressor 44 thereby also drives the low pressure compressor 44 at a lower speed than the shaft 40.

Figure 2A:
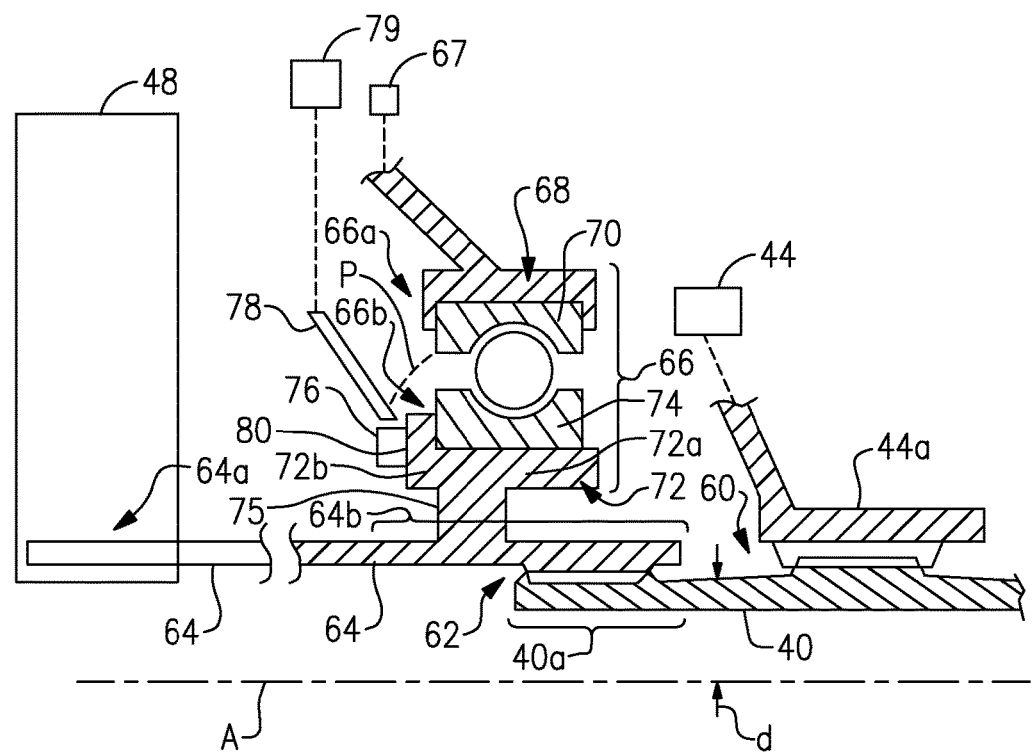
FIG. 2A illustrates an example from the engine of FIG. 1A that has a bearing assembly with a speed sensor target.
Figure 2B:
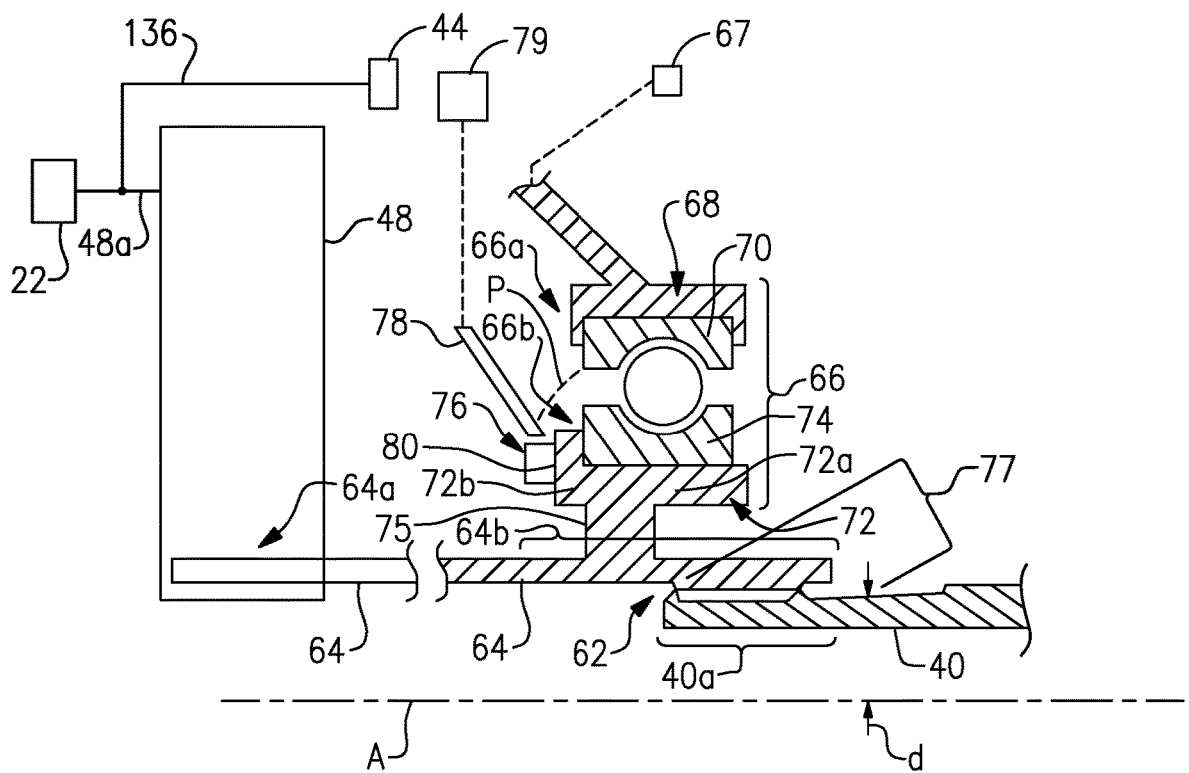
FIG. 2B illustrates an example from the engine of FIG. 1B that has a bearing assembly with a speed sensor target.

FIG. 2A schematically illustrates selected components of the above-described gas turbine engine 20, and FIG. 2B illustrates the corresponding components in the engine 120. As shown in FIG. 2A, the shaft 40 is connected in a first joint 60 to a compressor hub 44a that is coupled to drive the first compressor 44. In FIG. 2B, the joint 60 and compressor hub 44a are excluded because the compressor 44 in the engine 120 is tied to the fan 22. As the remaining components are identical between the engines 20/120, the following description is made with reference to both engines 20/120 except where noted otherwise. The shaft 40 includes a forward end 40a, which includes the terminal edge of the shaft 40 as well as the vicinity immediately axially inwards from the terminal edge. At its forward end 40a the first shaft 40 is connected in a joint 62 to a fan drive input shaft 64.

The fan drive input shaft 64 has a forward end 64a and an aft end 64b. The forward end 64a is received into the fan drive gear system 48. For example, the forward end 64a engages a sun gear or other rotational input of the fan drive gear system 48. The aft end 64b is connected in the second joint 62 to the first shaft 40. In the illustrated example, the joints 60/62 include respective splined interfaces, but the joints 60/62 are not limited to splined connections.

The engines 20/120 further include a bearing assembly 66, which is axially forward of the joint 60 in engine 20 and is axially aft of the forward end 64a of the fan drive input shaft 64 in both engines 20/120. The bearing assembly 66 supports the fan drive input shaft 64, and through the joint 62 the bearing assembly 66 also indirectly supports the first shaft 40. The bearing assembly 66 is adjacent to, and is radially spaced from, the forward end 40a of the first shaft 40. In the illustrated examples, at least a portion of the bearing assembly 66 axially overlaps the position of the joint 62. Alternatively, the bearing assembly 66 may be located farther aft on the aft end 64b of the fan drive input shaft 64 or located on the forward end 40a of the first shaft 40 and still be considered to be adjacent to the forward end 40a of the first shaft 40.

As shown, the bearing assembly 66 includes a radially outer portion 66a and a radially inner portion 66b. Generally, the radially outer portion 66a is non-rotatable and the radially inner portion 66b is rotatable with the fan drive input shaft 64 and forward end 40a of the first shaft 40. For example, the radially outer portion 66a is connected through a support arm to an engine static case structure 67, such as a front center body structure.

The radially outer portion 66a includes a radially outer bearing retainer 68 and a radially outer bearing race 70. The radially inner portion 66b includes a radially inner bearing retainer 72 and a radially inner bearing race 74. The radially inner bearing retainer 72 includes a bracket section that is comprised of an axially-elongated wall 72a and a radial shoulder 72b that projects radially outwardly from a forward portion of the axially elongated wall 72a. A shank section 75 connects the axially-elongated wall 72a of the bracket section to the fan drive input shaft 64 (or alternatively to the forward end 40a of the first shaft 40). The radially outer and inner bearing races 70/74 are retained in the respective bearing retainers 68/72, such as by welding, bonding, or mechanical fastening. As a result, the bearing retainers 68/72 and shank section 75 bear and transfer radial, axial, and tangential loads in the bearing 66.

The radially inner portion 66b of the bearing assembly 66, in addition to its functional features as a bearing, includes a speed sensor target 76. The target 76 serves for speed sensing but is otherwise non-functional and is not required for function of the bearing 66 as a rotational support. The target 76 is rotatable with the radially inner portion 66b about the engine axis A and defines a rotation path, represented at P. The path P is the course along which the target 76 moves during rotation of the radially inner portion 66b. The path P is nominally circular but will deviate from circular as the target 76 deflects with deflection of the radially inner portion 66b and shaft 40. At least one speed sensor probe 78 is situated adjacent the rotation path P and is operable to read the target 76 and communicate with a controller 79, such as a full authority digital engine control. Although one speed sensor probe 78 is shown, it is to be appreciated that two or more probes could be used. Generally, there is a gap between the probe 78 and the target 76 (or path P).

The target 76 generally includes one or more discrete irregularities on the radially inner portion 66b which are readable by the probe 78. Example irregularities include, but are not limited to, a tooth or a group of circumferentially-distributed teeth, a tab or a group of circumferentially-distributed tabs, a depression or a group of circumferentially-distributed depressions, a groove or a group of circumferentially-distributed grooves, an optical marking or a group of circumferentially-distributed optical markings, or combinations of these. For electromagnetic reading, the target 76 may be formed of a ferromagnetic material, such as a ferromagnetic steel composition. In the illustrated example, the target 76 is located on the radial shoulder 72b. For instance, the target 76 is located on a forward axial face 80 of the radial shoulder 72b and projects axially from the forward axial face 80 such that the target 76 cantilevers forward with respect to the axially elongated wall 72a and the shank section 75, to facilitate access by the probe 78.

The reading of the target 76 involves generating signals caused by the target 76 passing by the probe 78. In that regard, the probe 78 may be, for example but not limited to an electromagnetic probe or an optical probe (e.g., laser). A characteristic of the signals varies in relation to how fast the target 76 passes by the probe 78. The signals thus represent speed of the target 76. It is to be understood, however, that the term "speed" is broadly used herein. For rotational movement herein, either explicit or implied, unless otherwise indicated such movement includes angular velocity with units of radians per unit time. Angular velocity can be used to determine other values of potential interest, such as but not limited to, linear velocity, linear acceleration, and angular acceleration. Inversely, the character of the signals may be used in a manner that represents values that can be used to determine angular velocity. It is to be understood that the controller 79 includes hardware (e.g., a microprocessor), software, or both, that is configured to perform the functions described herein.

Speed detection of a shaft may be used to identify a decoupling event. For instance, a shaft drives a fan. Although the fan rotates with the shaft, the mass and aerodynamic drag of the fan create a load on the shaft. If the fan decouples from the shaft, that load is released, yet the turbine continues to drive the shaft with the same power. This can result in a rapid increase in shaft speed. In order to accurately detect such a condition, shaft speed may be measured directly by way of a target at the outer surface of the shaft. For example, teeth may be formed integrally into the surface of the shaft as the target. A sensor probe is mounted in close proximity to the teeth. A radial spacing is established between the probe and the teeth by locating the teeth next to a bearing, where there are preferably minimal radial displacements of the shaft because of the support the bearing provides to the shaft at that location.

In an aspect of this disclosure, it is recognized that the above-described bearing assembly 66 can be adapted as a close surrogate in place of measuring shaft speed directly using a target formed integrally into the surface of the shaft. Since locations on the shaft surface or on the shaft surface in close proximity to a bearing are sought for accurate spacing or other reasons, such a location on the bearing assembly 66 is counter to, and uninformed by, the practice and critical radial spacing discussed above. Moreover, given that the bearing assembly 66 would be subject to additional and/or different loads than a shaft, known practices for location and spacing are not indicative of location on the bearing assembly 66. For instance, the speed at the location of the target 76 may differ at times from the speed at the surface of the shaft 40 due to displacement of the radially inner portion 66 from loads on the bearing assembly 66. For instance, the target 76 may deflect with the radially inner bearing retainer 72 and/or shank section 75 in directions either with or against rotational movement, thereby yielding a speed that is either faster or slower, respectively, than the relative rotational movement or the shaft 40.

The speed at the location of the target 76 may also differ at times from the speed at the surface of the shaft 40 due to a twisting effect. As an example, under torque during engine operation, the shaft 40 and fan drive input shaft 64 may torsionally deflect about the engine axis A. In particular, the portion of the shaft 40 near its forward end 40a torsionally deflects relative to its aft portion at the low pressure turbine 46. As a result, at the location of the target 76, the magnitude of arc length displacement relative to its position at rest is greater than the magnitude of arc length displacement taken at a location on the shaft 40 relative to its position at rest. As the shaft 40 cycles between different degrees of twist from changing loads, the target 76, at times, may move at a different speed than at the location on the surface of the shaft 40 due to the greater arc length displacement.

The target 76 on the bearing assembly 66 at times thus moves at disparate speeds relative to aft portions of the shaft 40. While the speed at the target 76 is not necessarily equivalent to the speed at the surface of the shaft 40, the speed taken at the target 76 is used as a surrogate for the speed of the shaft 40. In that regard, the target 76 and the probe 78 together provide a means for reading the rotational speed of the bearing assembly 66 as a surrogate for a rotational speed of the shaft 40. The target 76, however, is preferably not so far radially spaced from the shaft 40 that the target 76 may itself decouple during an event. As an example, relative to the diameter (d) of the shaft 40, the radial spacing from the surface of the shaft 40 to the bearing assembly 66 at the location at the midpoint of the target 76 is from 10% of the diameter to 65% of the diameter, which is radially inwards of any rotating hardware. In one example to demonstrate that is based on 10%, if the shaft has a diameter of 4 inches, the radial spacing from the surface of the shaft 40 to the bearing assembly 66 at the location at the midpoint of the target 76 is 0.4 inches. In further examples, the radial spacing is from about 25% to about 50% of the diameter of the shaft 40.

In further examples, the disparate speed may be used to enhance over-speed detection time. As over-speed conditions may occur very rapidly, faster detection of the over-speed condition may facilitate more rapid triggering of mitigating actions by the controller 79, such as reducing fuel supply to the combustor 56. As an example, a relatively higher speed at the target 76 and/or a greater rate of acceleration at the target 76 will surpass a given trigger threshold in a shorter amount of time due to the disparate speed. As a result, the over-speed is triggered more rapidly and the controller 79 can respond in a shorter amount of time to decrease or cease fuel supply to the combustor 56.

In the engine 120, the low pressure compressor 44 is rotationally tied with the fan 42. Therefore, the combined mass and aerodynamic drag of the fan 42 and the low pressure compressor 44 create a load on the shaft 40, especially at high or maximum power conditions. If the fan 42 and low pressure compressor 44 were to decouple from the shaft 40, that combined load would be released, yet the low pressure turbine 46 would continue to drive the shaft 40 with the same power. This would cause rapid acceleration of the shaft 40. This acceleration would be higher than in a comparable engine in which the low pressure compressor is not tied with the fan (e.g., where the low pressure compressor is not driven via the fan drive gear system). In that case, rather than a combined load of the fan and low pressure compressor, the load would be from only the fan and would be lower than the load from a combined fan/low pressure compressor. The resulting acceleration would therefore be lower than the acceleration from decoupling of the combined fan/low pressure compressor load. The higher acceleration from the release of the combined load, in turn, means that the shaft 40 would reach a given over-speed threshold in a shorter amount of time than it would at the lower acceleration.

In recognition of the more rapid acceleration and shortened time to reach the over-speed threshold, the engine 120 is configured to enhance over-speed detection time. In this regard, in connection with the issue of detection time, the inventors have recognized that the speed sensing system can be manipulated with respect to torsion of the shaft 40 in order to facilitate enhancing detection time. In particular, when the rotation of the low pressure turbine 46 rotationally drives the shaft 40, the shaft 40 is subjected to torsional deflection. Such torsional deflection will vary along the axial length of the shaft 40. The shaft 40 in engine 120 in FIG. 2B has a twist section, represented at 77, at which the torsional deflection is greatest along the shaft 40. As an example, the section of greatest torsional deflection is determined under maximum power demand on the engine 120. Generally, the twist section 77 is the location and immediate vicinity of where the peak torsional deflection occurs along the shaft 40. The section of greatest torsional deflection may be determined through testing and/or computer simulation, for example.

In the engine 120, the twist section 77 is the front end 40a of the shaft 40 where the shaft 40 is joined with the fan drive input shaft 64 in the joint 62. As will be appreciated, however, the twist section 77 may be elsewhere along the shaft 40 depending on the particular design of the engine 120. As an example, if the shaft 40 were joined at a location intermediate of its ends, the twist section 77 may be in the intermediate location.

The speed sensor target 76 is located adjacent to the twist section 77 in engine 120, e.g., adjacent to the front end 40a in the example shown. If a decoupling event occurs and releases the combined load of the fan 42 and the low pressure compressor 44, the shaft 40 would accelerate. The release of the load would also cause the shaft 40 to recover at least a portion of the torsional deflection, which would be most pronounced at the twist location 77. At the twist location 77 there would thus be an additional component of acceleration, which would be the acceleration due to recovery of the torsional deflection. Accordingly, if the load is released, the acceleration at the twist location 77 would be higher than it would otherwise be without the added acceleration from torsional deflection recovery. The higher acceleration at the twist section 77 will cause the twist section 77 of the shaft 40 to reach a given trigger threshold, such as a speed threshold, an acceleration threshold, or both, in a relatively shorter amount of time in comparison to a location on the shaft 40 at which there is zero torsional deflection. As a result, the controller 79 can identify an over-speed condition more rapidly and respond in a shorter amount of time to trigger a decrease/cessation of fuel supply to the combustor 56.

In addition, the location of the target 76 in the bearing assembly 66 may also facilitate access. As the bearing assembly 66 is radially spaced outwardly from the shaft 40, there is a relatively short radial distance over which the probe 78 is inserted into the engine 20/120 in order to reach the location of the target 76 as compared to insertion to a location near the surface of the shaft 40. Furthermore, at the illustrated axial location, the bearing assembly 66, and thus the target 76, may be accessible, for example through engine static case structure 67 where there are no rotational components. As a result, in some instances the target 76 and probe 78 may be inspected or even repaired or replaced.

Figure 3A:
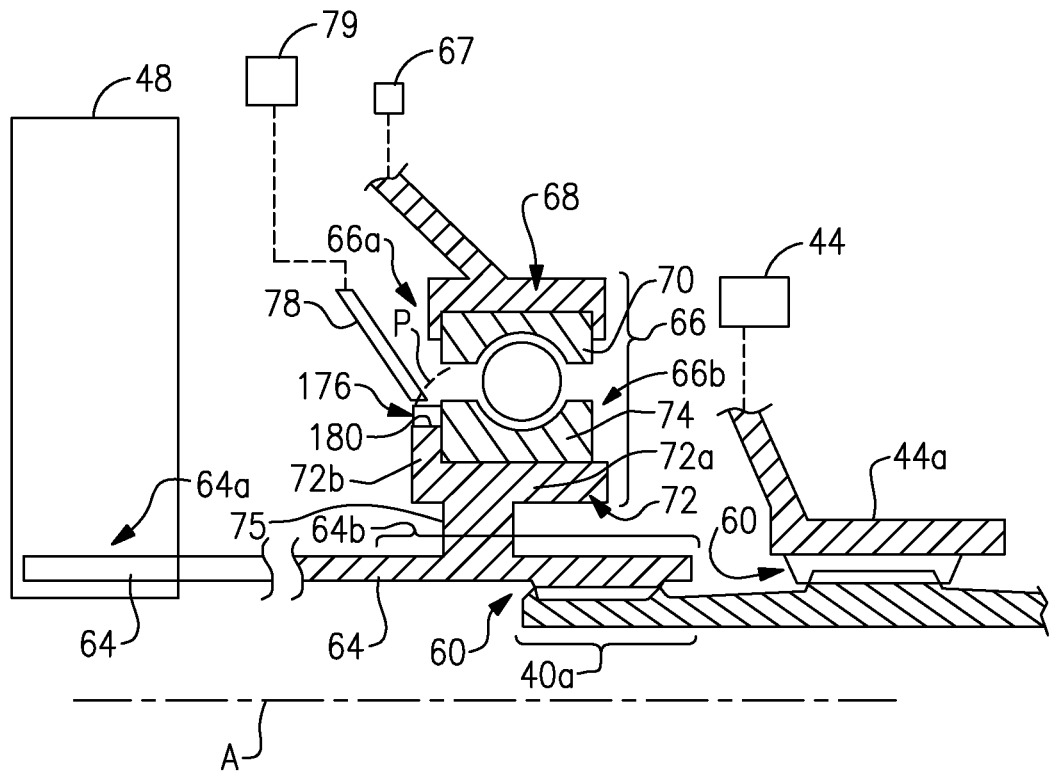
FIG. 3A illustrates another example location of a speed sensor target in a bearing assembly of the engine of FIG. 1A.

FIG. 3A (from engine 20) and 3B (from engine 120) illustrate modified examples, respectively, of the examples of FIGS. 2A and 2B except that instead of the target 76, there is target 176. In this example, the target 176 is located on a radial face 180 of the radial shoulder 72b. For example, the target 176 projects radially from the radial face 180. The target 176 is otherwise the same as the target 76 described above. In the position on the radial face 180, the target 176 may be somewhat less physically accessible due to potential hindrances from its location radially between the bearing retainers 68/72. However, to some extent those physical hindrances may be counteracted by enhanced accessibility from the radial orientation of the target 176. In further examples, with engine access through the case structure 67, the target 76/176 is located on the aft side of the radially inner bearing retainer 72. In this regard, the radial shoulder 72b, or an additional radial wall, is provided on the aft side of the axially elongated wall 72a and the target 76/176 is located on such wall as discussed above.

Figure 4:
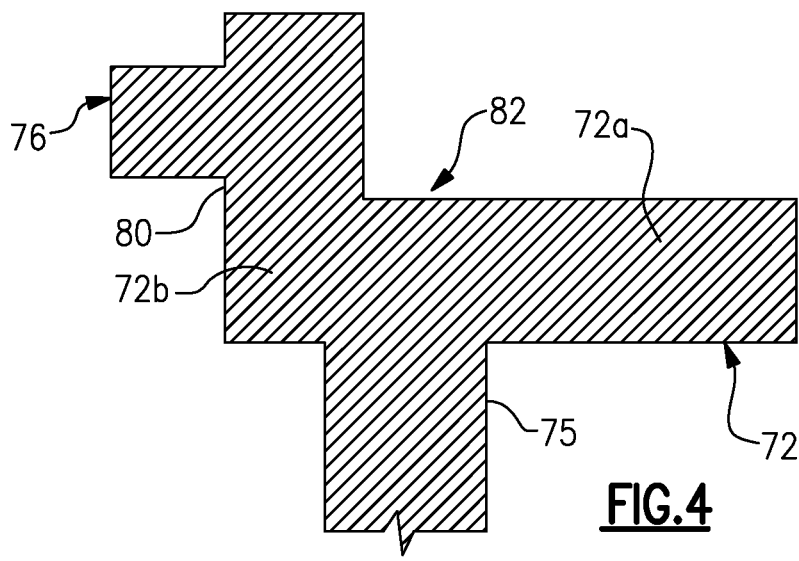
FIG. 4 illustrates an example in which a speed sensor target and a portion of a bearing assembly together provide a single, monolithic body.
Figure 3B:
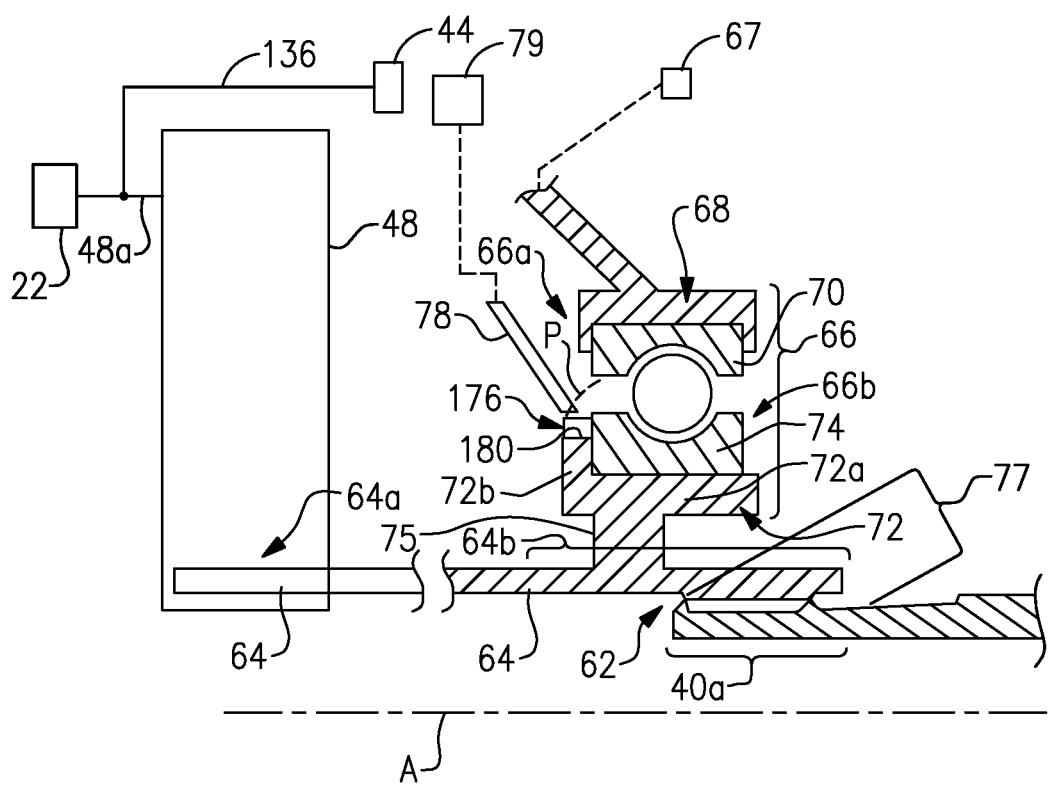
FIG. 3B illustrates another example location of a speed sensor target in a bearing assembly of the engine of FIG. 1B.

FIG. 4 illustrates a sectioned view of an additional example. In this example, the target 76 and the radially inner bearing retainer 72 together provide a single, monolithic body, which is generally represented at 82. The monolithic body 82 is continuous throughout and contains no seams, joints, or bond lines (e.g., from welding, brazing, or the like). In this regard, the target 76 is formed with the bearing retainer 72, such as by casting or machining, from a ferromagnetic alloy. Such a monolithic body facilitates strength of the target 76 and reduction of separate pieces that require assembly. Likewise, the target 176 and the radially inner bearing retainer 72 may also together provide the single, monolithic body.

Figure 5:
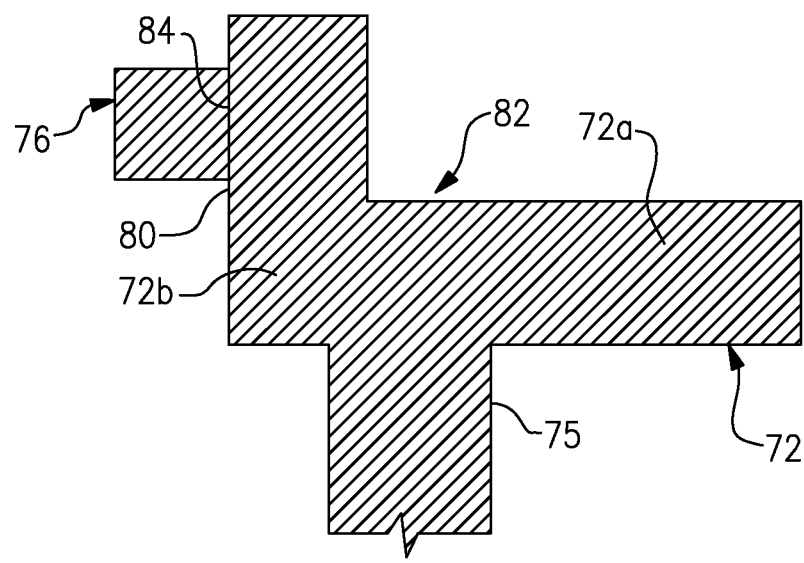
FIG. 5 illustrates an example in which a speed sensor target is bonded with a portion of a bearing assembly.

Alternatively, in a further example shown in FIG. 5, the target 76 is bonded to the radially inner bearing retainer 72 at a seam or joint 84. For instance, the joint 84 is a structural discontinuity representing the interface at which the target 76 has been attached through a bonding process to the bearing retainer 72, such as by welding or brazing. In this regard, the joint 84 may be macroscopically visible. Additionally, because the target 76 is initially a separate piece that is then bonded to the bearing retainer 72, the target 76 may be separately fabricated, such as to take advantage of lower cost or favored fabrication processes.

A separate, bonded target 76 provides for the bearing retainer 72 to be formed of non-ferromagnetic material, such as a titanium alloy. In this case, the target 76 (or 176) is formed of a ferromagnetic material and is then bonded to the non-ferromagnetic bearing retainer 72.

Figure 6:
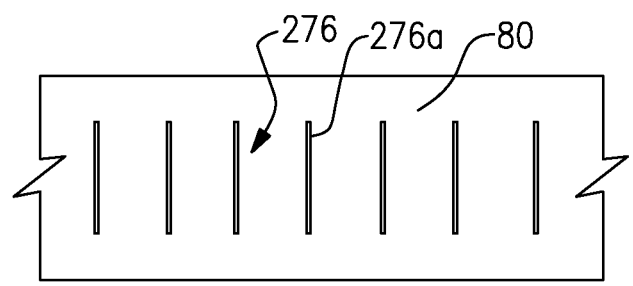
FIG. 6 illustrates an example in which a speed sensor target is an optical target.

FIG. 6 shows a further example in which, rather than the target being ferromagnetic, there is a target 276 that is an optical target. For example, the target 276 includes one or more regions 276a on the axial face 80 (or the radial face 180) that are optically distinct and readable by an optical version of the probe 78. Such regions 276a may be, but are not limited to, those that are optically distinct by way of color or brightness, for example by a high contrast surface coating or surface texture.

Figure 7A:
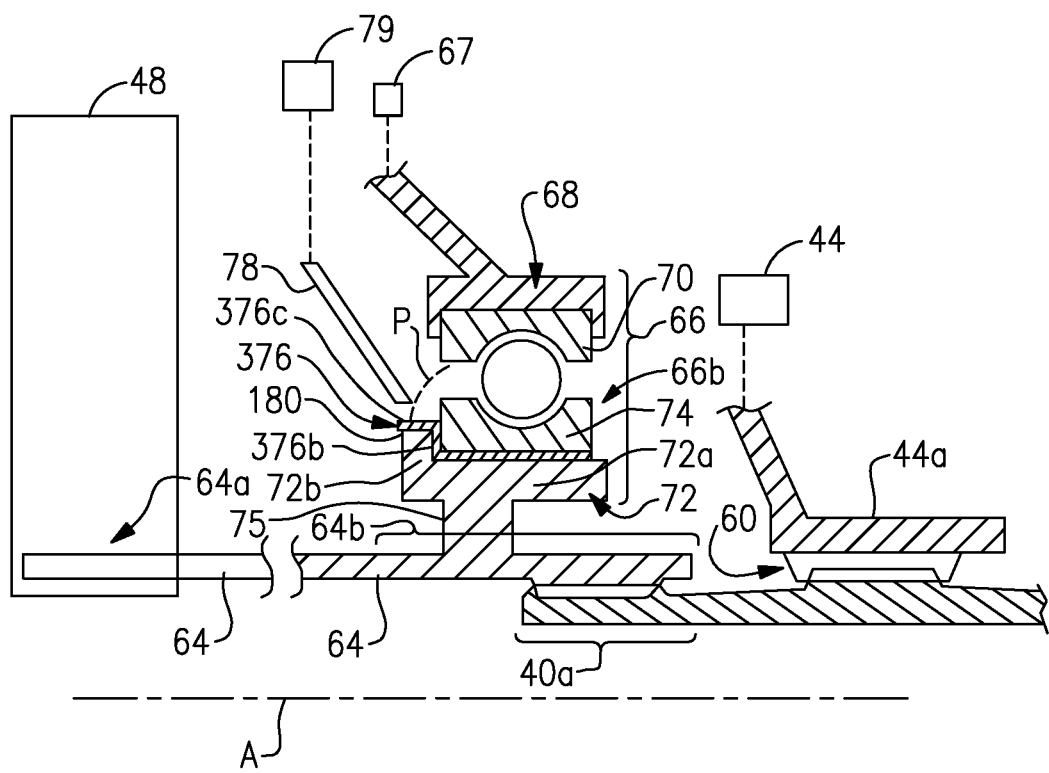
FIG. 7A illustrates an example in which a speed sensor target is sandwiched between a bearing race and a bearing retainer in a bearing assembly of the engine of FIG. 1A.
Figure 7B:
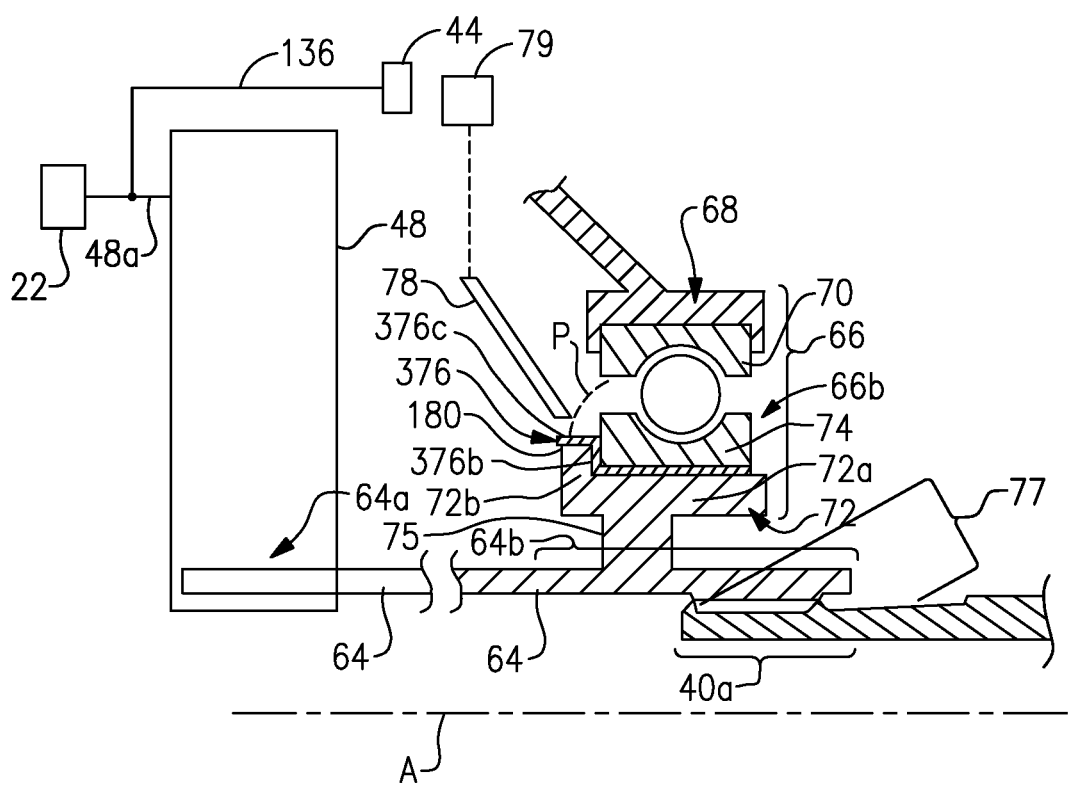
FIG. 7B illustrates an example in which a speed sensor target is sandwiched between a bearing race and a bearing retainer in a bearing assembly of the engine of FIG. 1B.

FIG. 7A (from engine 20) and 7B (from engine 120) show another example in which, rather than the target being monolithic with or bonded at the radial shoulder 72b, there is a target 376 that is retained by the radially inner bearing retainer 72 and the radially inner race 74. As shown, the target 376 in this example includes an axial section 376a, a radial section 376b, and a target section 376c. The axial section 376a is sandwiched radially between the radially inner bearing retainer 72 and the radially inner race 74 to retain the target 376 in place. If further securing is desired, the target 376 may also be bonded to the radially inner bearing retainer 72 and/or radially inner race 74, although this may somewhat hinder repair or replacement. The radial section 376b tracks the radial shoulder 72b of the radially inner bearing retainer 72. The target section 376c is located adjacent the radial face 180 of the radial shoulder 72b and serves as the section that is read by the probe 78. As the target 376 is a separate piece from the radially inner bearing retainer 72 and race 74, like a bonded target the target 376 may enable use of non-ferromagnetic materials in the bearing assembly 66 and may be separately fabricated. Moreover, the target 376 (especially if not bonded) may be removed for repair or replacement Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:
1. A gas turbine engine, comprising:
a fan;
a fan drive gear system coupled with the fan and a fan drive input shaft;
a compressor section including a first compressor and a second compressor;
a turbine section including:
a first turbine coupled with a first shaft, and
a second turbine coupled through a second shaft to the second compressor;

a bearing assembly supporting the fan drive input shaft, the bearing assembly being located proximal to, and radially spaced from, a forward end of the first shaft, the bearing assembly including a speed sensor target that is rotatable with the forward end and that defines a rotation path, the bearing assembly including a radially outer bearing retainer, a radially outer bearing race retained in the radially outer bearing retainer, a radially inner bearing retainer, and a radially inner bearing race retained in the radially inner bearing retainer, the radially inner bearing retainer including a bracket section and a shank section connecting the bracket section to the fan drive input shaft and radially spacing at least a portion of the bearing assembly from the forward end; and a speed sensor probe situated proximal to the rotation path and operable to read the speed sensor target, the speed sensor target being located on the bracket section.

2. The gas turbine engine as recited in claim 1, wherein the bracket section includes an axially elongated wall, and a radial shoulder projecting from a forward portion of the axially elongated wall, and the speed sensor target is located on the radial shoulder.

3. The gas turbine engine as recited in claim 2, wherein the radial shoulder includes a forward axial face, and the speed sensor target projects axially from the forward axial face.

4. The gas turbine engine as recited in claim 2, wherein the radial shoulder includes a radial face, and the speed sensor target projects radially from the radial face.

5. The gas turbine engine as recited in claim 1, wherein the speed sensor target is bonded to the radially inner bearing retainer.

6. The gas turbine engine as recited in claim 1, wherein the speed sensor target includes a flange that is disposed radially between the radially inner bearing race and the radially inner bearing holder.

7. The gas turbine engine as recited in claim 1, wherein the speed sensor target includes an optical target.

8. The gas turbine engine as recited in claim 1, wherein the first shaft has a shaft diameter at the first end, and at least a portion of the bearing assembly is radially spaced from the first shaft by at least 10% of the shaft diameter.

9. The gas turbine engine as recited in claim 8, wherein the bearing assembly is radially spaced from the first shaft by no more than 65% of the shaft diameter.

10. The gas turbine engine as recited in claim 1, wherein the first shaft is connected in a joint to a compressor hub of the first compressor.

11. The gas turbine engine as recited in claim 1, wherein the fan drive gear system has an output shaft coupled with the first compressor and the fan.

12. The gas turbine engine as recited in claim 1, wherein the speed sensor target and the radially inner bearing retainer together provide a single, monolithic body.

13. The gas turbine engine as recited in claim 1, wherein the first shaft has a shaft diameter at the first end, and the target as taken at a location at a midpoint of the target is radially spaced from the first shaft by at least 10% of the shaft diameter and by no more than 65% of the shaft diameter.

14. The gas turbine engine as recited in claim 13, wherein the target is radially spaced from the first shaft by 25% to 50% of the shaft diameter.

15. The gas turbine engine as recited in claim 14, wherein the shaft diameter is four inches.

16. The gas turbine engine as recited in claim 1, wherein the shank section is axially shorter than the bracket section.

* * * * *